United States Patent
Krishnapura Subbaraya et al.

(10) Patent No.: US 10,762,298 B2
(45) Date of Patent: Sep. 1, 2020

(54) METHOD AND DEVICE FOR AUTOMATIC DATA CORRECTION USING CONTEXT AND SEMANTIC AWARE LEARNING TECHNIQUES

(71) Applicant: WIPRO LIMITED, Bangalore (IN)

(72) Inventors: Prashanth Krishnapura Subbaraya, Bengaluru (IN); Raghavendra Hosabettu, Bangalore (IN)

(73) Assignee: Wipro Limited, Bangalore (IN)

( * ) Notice: Subject to any disclaimer, the term of this patent is extended or adjusted under 35 U.S.C. 154(b) by 246 days.

(21) Appl. No.: 15/935,087

(22) Filed: Mar. 26, 2018

(65) Prior Publication Data

US 2019/0251167 A1    Aug. 15, 2019

(30) Foreign Application Priority Data

Feb. 10, 2018    (IN) .............................. 201841005108

(51) Int. Cl.
*G06F 40/30* (2020.01)
*G06N 20/00* (2019.01)

(52) U.S. Cl.
CPC ............. *G06F 40/30* (2020.01); *G06N 20/00* (2019.01)

(58) Field of Classification Search
None
See application file for complete search history.

(56) References Cited

U.S. PATENT DOCUMENTS

| | | | | |
|---|---|---|---|---|
| 5,325,298 A * | 6/1994 | Gallant | ................. | G06F 16/355 704/9 |
| 5,619,709 A * | 4/1997 | Caid | ...................... | G06F 16/58 715/209 |
| 5,675,819 A * | 10/1997 | Schuetze | .............. | G06F 40/253 704/10 |
| 7,620,539 B2 * | 11/2009 | Gaussier | ................. | G06F 40/45 704/2 |
| 10,380,236 B1 * | 8/2019 | Ganu | .................... | G06F 40/126 |

(Continued)

OTHER PUBLICATIONS

Zhen Yang, Wei Chen, Bo Xu, "Improving Neural Machine Translation with Conditional Sequence Generative Adversarial Nets", Institute of Automation, Chinese Academey of Sciences, public on p. 8 Nov. 2017, pp. 1-10.*

(Continued)

*Primary Examiner* — Thuykhanh Le
(74) *Attorney, Agent, or Firm* — Finnegan, Henderson, Farabow, Garrett & Dunner, LLP

(57) ABSTRACT

A method and device for automatic data correction using context and semantic aware learning techniques is disclosed. The method includes extracting data within a document as machine readable text in a predefined format. The method further includes encoding each word of each line in the machine readable text to a multi-dimension word vector. The method includes generating a context word vector for each word in each line based on multi-dimension vectors associated with words succeeding and preceding the word in a line comprising the word. The method further includes decoding the context word vector associated with each word in each line to generate a corrected context word vector for each word. The method includes validating the corrected context word vector associated with each word in each line.

16 Claims, 6 Drawing Sheets

(56) References Cited

U.S. PATENT DOCUMENTS

| | | | | |
|---|---|---|---|---|
| 2002/0016798 A1* | 2/2002 | Sakai | ................... | G06F 40/268 |
| | | | | 715/234 |
| 2005/0283364 A1* | 12/2005 | Longe | ............... | G06K 9/00422 |
| | | | | 704/257 |
| 2008/0195571 A1* | 8/2008 | Furuuchi | ............... | G06F 40/274 |
| | | | | 706/56 |
| 2009/0216690 A1* | 8/2009 | Badger | ................ | G06F 3/0237 |
| | | | | 706/11 |
| 2011/0010174 A1* | 1/2011 | Longe | ................... | G10L 15/24 |
| | | | | 704/235 |
| 2014/0249799 A1* | 9/2014 | Yih | ........................ | G06F 16/36 |
| | | | | 704/9 |
| 2014/0297267 A1* | 10/2014 | Spencer | ............... | G06F 40/274 |
| | | | | 704/9 |
| 2016/0336006 A1* | 11/2016 | Levit | ....................... | G10L 15/10 |
| 2017/0091168 A1* | 3/2017 | Bellegarda | ........... | G06F 40/274 |
| 2017/0109344 A1* | 4/2017 | Shmueli | ............. | G10L 15/1815 |
| 2018/0067918 A1* | 3/2018 | Bellegarda | ............. | G10L 25/30 |
| 2018/0144234 A1* | 5/2018 | Devesa | ................. | G06N 3/006 |
| 2018/0165269 A1* | 6/2018 | Liu | ....................... | G06F 40/242 |
| 2018/0189284 A1* | 7/2018 | Hosabettu | ........... | G06F 12/0223 |
| 2018/0198602 A1* | 7/2018 | Duffy | ..................... | H04L 9/008 |
| 2018/0218253 A1* | 8/2018 | Sen | .......................... | G06N 3/08 |
| 2018/0267952 A1* | 9/2018 | Osborne | ................ | G06F 40/10 |
| 2018/0336183 A1* | 11/2018 | Lee | ......................... | G06F 40/30 |
| 2018/0336184 A1* | 11/2018 | Bellegarda | ............. | G06F 40/30 |
| 2018/0349349 A1* | 12/2018 | Bellegarda | ............. | G10L 25/30 |
| 2019/0005019 A1* | 1/2019 | Burke | .................... | G16H 50/70 |
| 2019/0026550 A1* | 1/2019 | Yang | ...................... | G06K 9/627 |
| 2019/0130073 A1* | 5/2019 | Sun | ...................... | G06K 9/6223 |
| 2019/0138652 A1* | 5/2019 | Miranda | ............... | G06F 16/353 |
| 2019/0164132 A1* | 5/2019 | Borje | ................. | G06Q 10/1053 |
| 2019/0188257 A1* | 6/2019 | Iida | ..................... | G06F 16/3347 |
| 2019/0197105 A1* | 6/2019 | Tagra | .................... | G06F 40/117 |
| 2019/0199741 A1* | 6/2019 | Myara | ................. | H04L 63/1425 |
| 2019/0205372 A1* | 7/2019 | Li | ........................... | G06N 20/00 |

OTHER PUBLICATIONS

Goyal, A. et al., "Professor Forcing: A New Algorithm for Training Recurrent Networks", *NIPS*, (2016), pp. 1-9.

Xiao, X., "Text Generation using Generative Adversarial Training", pp. 1-6.

Yang, Z., et al., "Improving Neural Machine Translation with Conditional Sequence Generative Adversarial Nets", (2017), *Thanapon Noraset*, pp. 1-10.

\* cited by examiner

METHOD AND DEVICE FOR AUTOMATIC DATA CORRECTION USING CONTEXT AND SEMANTIC AWARE LEARNING TECHNIQUES

TECHNICAL FIELD

This disclosure relates generally to data extraction and correction and more particularly to method and device for automatic data correction using context and semantic aware learning techniques.

BACKGROUND

For finance institutions and professionals, conducting "Know Your Customer (KYC)" process is a crucial task at the point of sale. The KYC solution sits in parallel to all the data exchange and transactional systems. These systems help financial institutions in avoiding the risks and vulnerability of fraud by the customers. Thus, data collection or extraction from documents provided by the customers for KYC must be highly accurate. The text data in such documents may include spelling mistakes, punctuation errors, and also some junk characters. These errors deteriorate the extraction accuracy of information from documents for the purpose of KYC.

One of the conventional techniques uses taxonomy based or dictionary based approaches to correct such erroneous data. However, this conventional technique is not scalable and have some limitations. The limitations may include: the dictionary or the taxonomy list must be updated continuously; the context in which the word appears is not considered, it is hard to correct numerical data in the financial tables, and it may not be able to identify noise characters without knowing context and semantic correctness.

Another conventional technique proposes a method for generating text using various machine learning algorithms, for example, Recurrent Neural Network (RNN). RNN is used to generate a text and validate the text using a generative adversarial network. The RNN initially generates some random noise, which may be corrected, based on the feedback of generative adversarial network. This process repeats until proper text with semantical meaning is generated. However, this conventional technique only generates the text from noise and does not correct the data based on its semantical context.

Yet another conventional technique builds a conditional sequence generative adversarial net which comprises of two adversarial sub models, a generative model (generator) which translates the source sentence into the target sentence as the traditional Neural Machine Translation (NMT) models do and a discriminative model (discriminator) which discriminates the machine translated target sentence from the human translated one. However, this conventional technique deals with generating text word-by-word and validates the text generation using generative adversarial network, but it also doesn't correct any errors generated.

Another conventional technique uses the teacher forcing algorithm that trains recurrent networks by supplying observed sequence values as inputs during training and using the network's own one-step ahead predictions to do multi-step sampling. However, this conventional technique uses a different algorithm to validate the output to sequence generated using RNN. In this approach, the semantic context is not considered. The algorithm validates the data generated against the actual data, but does not correct the data.

SUMMARY

In one embodiment, a method for automatic data correction is disclosed. The method includes extracting, by a data extraction device, data within a document as machine readable text in a predefined format. The method further includes encoding, by an encoder in the data extraction device, each word of each line in the machine readable text to a multi-dimension word vector. The method includes generating, by the data extraction device, a context word vector for each word in each line based on multi-dimension vectors associated with words succeeding and preceding the word in a line comprising the word. The method further includes decoding, by a decoder in the data extraction device, the context word vector associated with each word in each line to generate a corrected context word vector for each word. The method includes validating, by the data extraction device, the corrected context word vector associated with each word in each line.

In another embodiment, a data extraction device for automatic data correction. The data extraction device includes a processor and a memory communicatively coupled to the processor, wherein the memory stores processor instructions, which, on execution, causes the processor to extract data within a document as machine readable text in a predefined format. The processor instructions further cause the processor to encode each word of each line in the machine readable text to a multi-dimension word vector. The processor instructions cause the processor to generate a context word vector for each word in each line based on multi-dimension vectors associated with words succeeding and preceding the word in a line comprising the word. The processor instructions further cause the processor to decode the context word vector associated with each word in each line to generate a corrected context word vector for each word. The processor instructions cause the processor to validate the corrected context word vector associated with each word in each line.

In yet another embodiment, a non-transitory computer-readable storage medium is disclosed. The non-transitory computer-readable storage medium has instructions stored thereon, a set of computer-executable instructions causing a computer comprising one or more processors to perform steps comprising extracting data within a document as machine readable text in a predefined format; encoding each word of each line in the machine readable text to a multi-dimension word vector; generating a context word vector for each word in each line based on multi-dimension vectors associated with words succeeding and preceding the word in a line comprising the word; decoding the context word vector associated with each word in each line to generate a corrected context word vector for each word; and validating the corrected context word vector associated with each word in each line.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
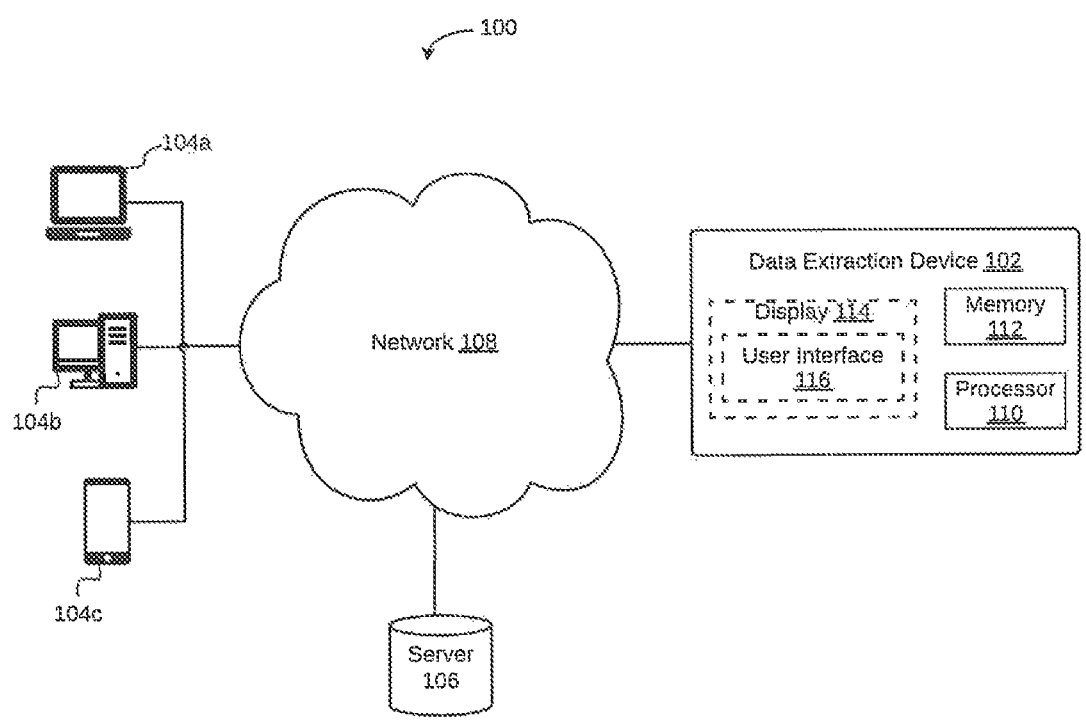
FIG. 1 is a block diagram illustrating a system for correcting data extracted from a document, in accordance with an embodiment.

Additional illustrative embodiments are listed below. In one embodiment, a system 100 for correcting data extracted from a document is illustrated in FIG. 1. Examples of these documents may include, but are not limited to PDF documents, images, or web-pages. These documents may have copy restrictions, which may lead to inaccuracy in text extracted from the documents. System 100 includes a data extraction device 102 that extracts content from these documents and thereafter corrects the content.

The documents may be accessed by a plurality of computing devices 104 (for example, a laptop 104*a*, a desktop 104*b*, and a smart phone 104*c*). The documents may be stored within plurality of computing devices 104. Other examples of plurality of computing devices 104, may include, but are not limited to a phablet and a tablet. Alternatively, the documents may be stored on a server 106 and may be accessed by plurality of computing devices 104 via a network 108. Network 108 may be a wired or a wireless network and the examples may include, but are not limited to the Internet, Wireless Local Area Network (WLAN), Wi-Fi, Long Term Evolution (LTE), Worldwide Interoperability for Microwave Access (WiMAX), and General Packet Radio Service (GPRS).

When a user of laptop 104*a*, for example, wants to extract correct data from a document accessed by the user, laptop 104*a* communicates with data extraction device 102, via network 108. Data extraction device 102 then reads the input data from the document (which may include few errors), builds the context of the input data based on the sequence in which the input data is read. Thereafter, data extraction device 102 uses a context building technique to correct the errors in the received input document. Data extraction device 102 then validates the corrected data with actual correct sentence, in order to train the model.

To this end, data extraction device 102 includes a processor 110 that is communicatively coupled to a memory 112, which may be a non-volatile memory or a volatile memory. Examples of non-volatile memory, may include, but are not limited to a flash memory, a Read Only Memory (ROM), a Programmable ROM (PROM), Erasable PROM (EPROM), and Electrically EPROM (EEPROM) memory. Examples of volatile memory may include, but are not limited Dynamic Random Access Memory (DRAM), and Static Random-Access memory (SRAM).

Memory 110 further includes various modules that enable data extraction device 102 to extract content from a document and thereafter correct the same. These modules are explained in detail in conjunction with FIG. 2. Data extraction device 102 may further include a display 114 having a User Interface (UI) 116 that may be used by a user or an administrator to upload documents and provide various inputs to data extraction device 102. Display 114 may further be used to display result of correcting the content extracted from a document. The functionality of data extraction device 102 may alternatively be configured within each of plurality of computing devices 104.

Figure 2:
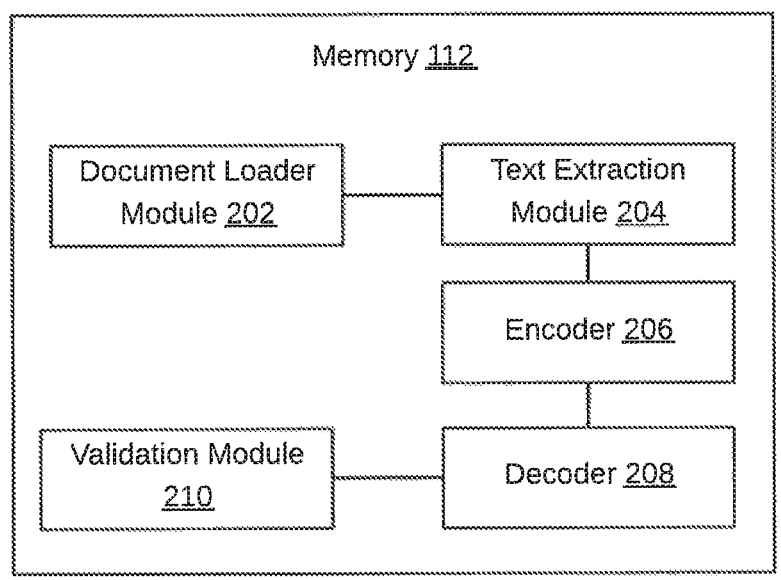
FIG. 2 is a block diagram illustrating various modules within a memory of a data extraction device configured to correct data extracted from a document, in accordance with an embodiment.

Referring now to FIG. 2, a block diagram illustrating various modules within memory 112 of data extraction device 102 configured to correct data extracted from a document, in accordance with an embodiment. Memory 112 includes a document loader module 202, a text extraction module 204, an encoder 206, a decoder 208, and a validation module 210.

Document loader module 202 enables to ingest and process a document, which may include erroneous data. The document, for example, may be a financial invoice. The one or more content, for example, may include, but is not limited to text, images, or text within images. The errors, for example, may include, but are not limited to spelling mistakes, punctuation errors, and junk characters. After receiving the document, document loader module 202 sends the document for further processing for correction and validation of errors. Text extraction module 204 then extracts data within the document as machine readable text in a predefined format. Text extraction module 204 acts as a wrapper, which converts many different types of input documents to a standard format, which can be processed by other modules in memory 112.

Once the data is extracted from the document, encoder 206 encodes each word of each line in the machine readable text to a multi-dimension word vector. Encoder 206 may use a sequence-to-sequence based machine learning algorithm in order to obtain the context and correct semantic information from the document. Encoder 206 also generates a context word vector for each word in each line based on multi-dimension vectors associated with words succeeding and preceding a word in a line that includes the word. This is further explained in detail in conjunction with FIG. 3 and FIG. 4.

Once context word vector for each word has been generated, decoder 208 decodes the context word vector associated with each word in each line to generate a corrected context word vector for each word. In an embodiment, if decoder 208 in data extraction device 102 is able to accurately generate a corrected context word vector based on the training data, the output will be shared as the corrected word or sentence; else, the corrected context word vector would be further processed in order to validate the same and train data extraction device 102. This is further explained in detail in conjunction with FIG. 3 and FIG. 4.

Validation module 210 then validates the corrected context word vector associated with each word in each line. In order to validate a context word vector, the associated features are enhanced to a larger dimension. The associated features may be enhanced using 2D-convolution in a discriminator network. This is further explained in detail in conjunction with FIG. 5.

Figure 3:
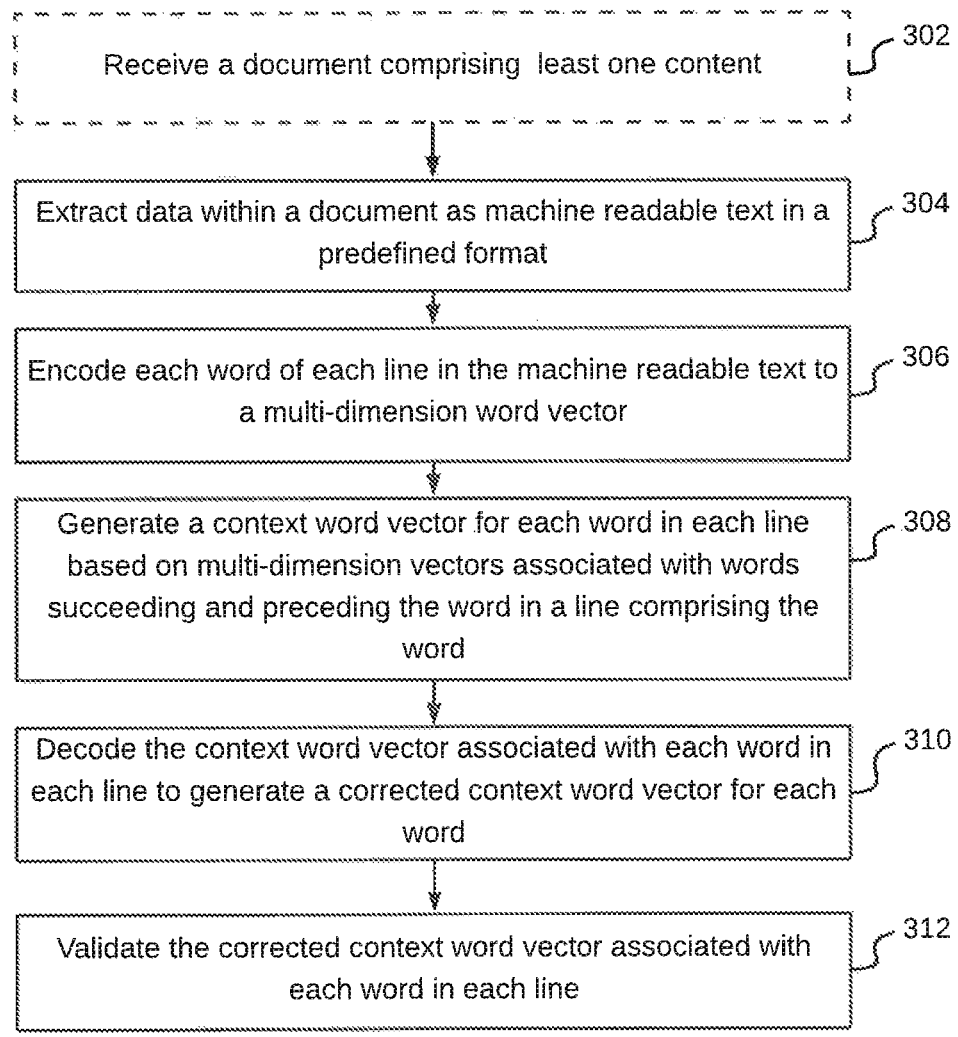
FIG. 3 illustrates a flowchart of a method for automatic data correction, in accordance with an embodiment.

Referring now to FIG. 3, a flowchart of a method for automatic data correction is illustrated, in accordance with an embodiment. At step 302, data extraction device 102 may receive a document that includes one or more contents. The document, for example, may be a financial invoice. The one or more content, for example, may include, but is not limited to text, images, or text within images. The one or more contents may include errors in the original document. Alternatively, the one or more content in the document may not include any errors, however, during content extraction from the document (for example, by way of Optical Character Recognition (OCR)), one or more contents may be erroneously recognized. The errors, for example, may include spelling mistakes, punctuation errors, and junk characters. The document may be provided to data extraction device 102, either via one or more of the plurality of computing devices or may be uploaded directly to data extraction device 102 by a user.

Data extraction device 102, at step 304, extracts data within the document as machine readable text in a predefined format. In other words, different types of inputs are converted into a standard format, which can be read and further analyzed by data extraction device 102. In an embodiment, data extraction device 102 may extract data in the document as normal text. The data thus extracted may include multiple errors, for example, spelling mistakes, punctuation errors, and junk characters. By way of an example, in an invoice document, after text is extracted from the invoice document, the word "Electric" may be extracted as "Cleclric" and the numerical value "1589" may be extracted as "IS89".

Once the data is extracted from the document, encoder 206 in data extraction device 102, at step 306, encodes each word of each line in the machine-readable text to a multi-dimension word vector. Based on the encoding, data extraction device 102 obtains the context and correct semantic information related to the extracted data or the machine readable text. Encoder 206 may use a sequence-to-sequence based machine learning algorithm in order to obtain the context and correct semantic information from the document received by data extraction device 102. In an embodiment, if there is an unrecognized word in the machine readable text, encoder 206 assigns a zero-word vector to that unrecognized word. When a zero-word vector is created, it gives an indication to data extraction device 102, that there may be a grammatical error or spelling error in a particular word extracted from the document as machine readable text. This is further explained in detail in conjunction with FIG. 4.

At step 308, data extraction device 102 generates a context word vector for each word in each line based on multi-dimension vectors associated with words succeeding and preceding a word in a line that includes the word. Thus, for a given word, a multi-dimension vector is created independent of other words in the document or close to that given word. However, a context word vector generated for that word will take into account the words preceding and succeeding that word. By way of an example, for a sentence that reads as: "Sit to stand electric control," a multi-dimensional vector for the word "stand" may be: [4.12, 3.34, 2.3, . . . , 0.0423]. However, the context word vector for the word "stand" is generated based on the immediately succeeding and preceding words, i.e., "to" and "electrical." The context word vector may be represented as: [0.656, 8.454, 0.542, . . . , 5.077].

Once context word vector for each word has been generated, decoder 208 in data extraction device 102, at step 310, decodes the context word vector associated with each word in each line to generate a corrected context word vector for each word. In order to generate a corrected context word vector for a word in the machine readable text, a context word vector associated with that word is compared with a training data set. The training data set may already have been created for a given word in the given context or a similar context. This is further explained in detail in conjunction with FIG. 4. In an embodiment, if decoder 208 in data extraction device 102 is able to accurately generate a corrected context word vector based on the training data, the output will be shared as the corrected word or sentence, else, the corrected context word vector would be further processed in order to validate the same and train data extraction device 102.

Thereafter, at step 312, data extraction device 102 validates the corrected context word vector associated with each word in each line. In order to validate a context word vector, the associated features are enhanced to a larger dimension. The associated features may be enhanced using 2D-convolution in a discriminator network. A correction validator in data extraction device 102 may use a multi-layer fully connected Convolution Neural Network (CNN). The first few layers of the CNN enhances the features of corrected context word vectors to larger dimensions. The remaining layers in the CNN may be the pooling layers that reduce the dimensions. The step of validation is further explained in detail in conjunction with FIG. 5.

Figure 4:
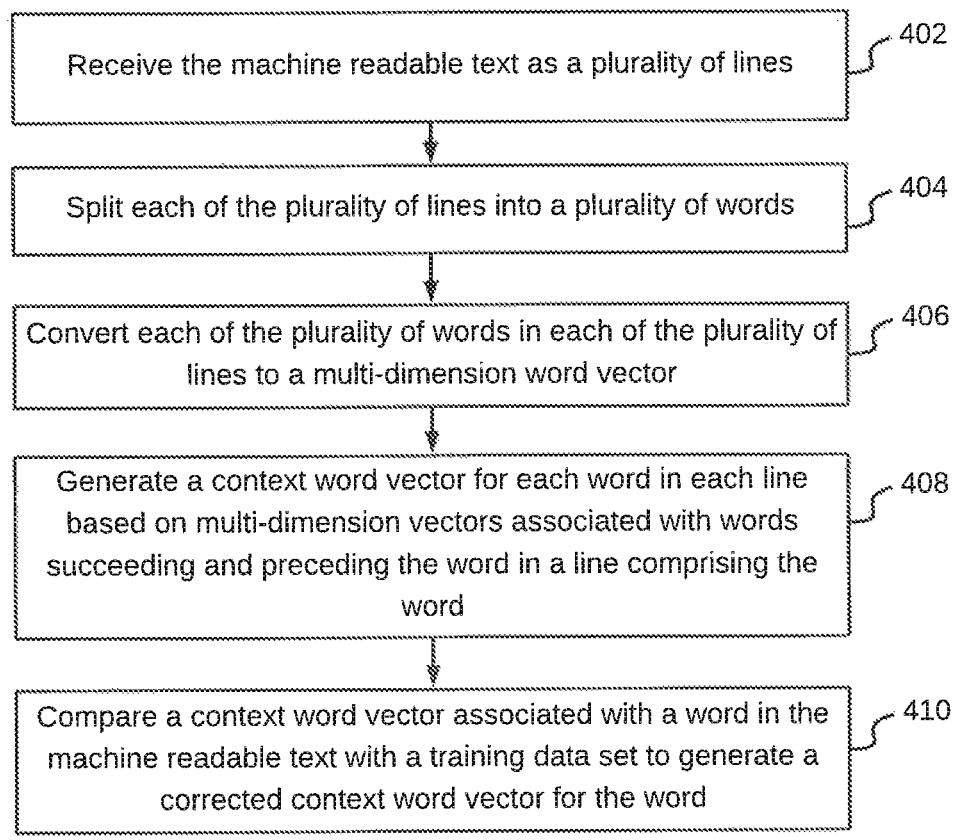
FIG. 4 illustrates a flowchart of a method of encoding and decoding data extracted from a document, in accordance with an embodiment.

Referring now to FIG. 4, a flowchart of a method for encoding and decoding data extracted from a document is illustrated, in accordance with an embodiment. Once data in a document is extracted from a document as machine readable text, encoder 206 in data extraction device 102 receives the machine readable text as a plurality of lines at step 402. In other words, the machine readable text is processed by data extraction device 102 line by line. By way of an example, the document may include the following line: "Sit to stand electric control . . . post." This line, may be extracted as "Sit to stand cleclric control . . . post." Thus, the word "electric" is erroneously extracted as "cleclric." Encoder 206 may include multiple layers of Long Short Term Memory (LSTM) cells in order to analyze the machine readable text, which is provide as an input to the multiple layers of LSTM cells.

At step 404, each of the plurality of lines is split into a plurality of words. In other words, a given line is split into an array of words and is then processed word by word. By way of an example, the machine readable text extracted for the document may include the line: "Sit to stand cleclric control . . . post." In this case, the sentence is split into the following array of words: ['Sit, 'to', 'stand', 'cleclric', 'control', . . . , 'post'].

Thereafter, at step 406, each of the plurality of words in each of the plurality of lines is converted into a multi-dimension word vector. In an embodiment, the word2vec model may be used to convert each words into a corresponding multi-dimension word vector. In other words, each word in a given line is individually processed in order to convert the same into a multi-dimension word vector. In an embodiment, in case of a word is unrecognized, the word may be converted into a zero-word vector. In continuation of the example above, conversion of each word into a multi-dimension word vector is depicted in table 1 given below:

TABLE 1

| Word | Multi-Dimension Vector |
|---|---|
| Sit | [0.12, 3.32, 4.23, . . . , 0.00923] |
| to | [0.34, 5.32, 6.3, . . . , 0.10923] |
| stand | [4.12, 3.34, 2.3, . . . , 0.0423] |
| cleclric | [0, 0, 0, 0, 0, 0, . . . , 0] |
| . | . |
| . | . |
| . | . |
| post | [0.32, 9.32, −1.23, . . . , 0.23 |

In table 1 above, as the word "cleclric" is an unrecognized word, a zero-word vector is assigned to it. The sequence in which words within a line are provided as an input to data extraction device 102, is used to store and build context for each word. In continuation of the example above, multi-dimension word vectors of the line may be stored in the following sequence: [0.12, 3.32, 4.23, . . . , 0.00923], [0.34, 5.32, 6.3, . . . , 0.10923], [4.12, 3.34, 2.3, . . . , 0.0423], [0, 0, 0, 0, 0, 0, . . . , 0], . . . , [0.32, 9.32, −1.23, . . . , 0.23].

At step 408, a context word vector is generated for each word in each line based on multi-dimension vectors associated with words succeeding and preceding the word in a line that includes the word. Thus, the multiple layers of LSTM cells updates the states, such that, the context of words succeeding and preceding a given word, are stored in the form of a context word vector. In continuation of the example given above, the context word vectors may be represented by table 2 given below:

TABLE 2

| Word | Context Word Vector |
|---|---|
| Sit | [0.232, 5.232, 9.342, . . . , 0.002] |
| to | [2.235, 3.556, 4.324, . . . , 0.564] |
| stand | [0.656, 8.454, 0.542, . . . , 5.077] |
| cleclric | [0.452, −4.56, 7.87, . . . , 0.2] |
| . | . |
| . | . |
| . | . |
| Post | [0.232, 5.232, 9.342, . . . , 0.002] |

The output of encoder 206 is provided to decoder 208 in data extraction device 102. In a manner similar to encoder 206, decoder 208 also includes multiple layers of LSTM cells. At step 410, for each word, decoder 208 compares a context word vector associated with that word with a training data set in order to generate a corrected context word vector for the word. The output from the encoder, i.e., context word vectors, are provided to decoder 208 in a sequence. Decoder 208 then updates its output state like encoder 206. Decoder 208 uses a mechanism, which stores the important sequences of data during training and uses this data, to test the input data and accordingly updates its output states resulting in a correct context word vector. In continuation of the example above, a corrected context word vector generated for the word "cleclric" is [0.233, 3.545, 9.343, . . . , 5.343]. The updated output state of decoder 208 is then sent for validation in order to determine the accuracy of the correction. This is further explained in detail in conjunction with FIG. 5.

Figure 5:
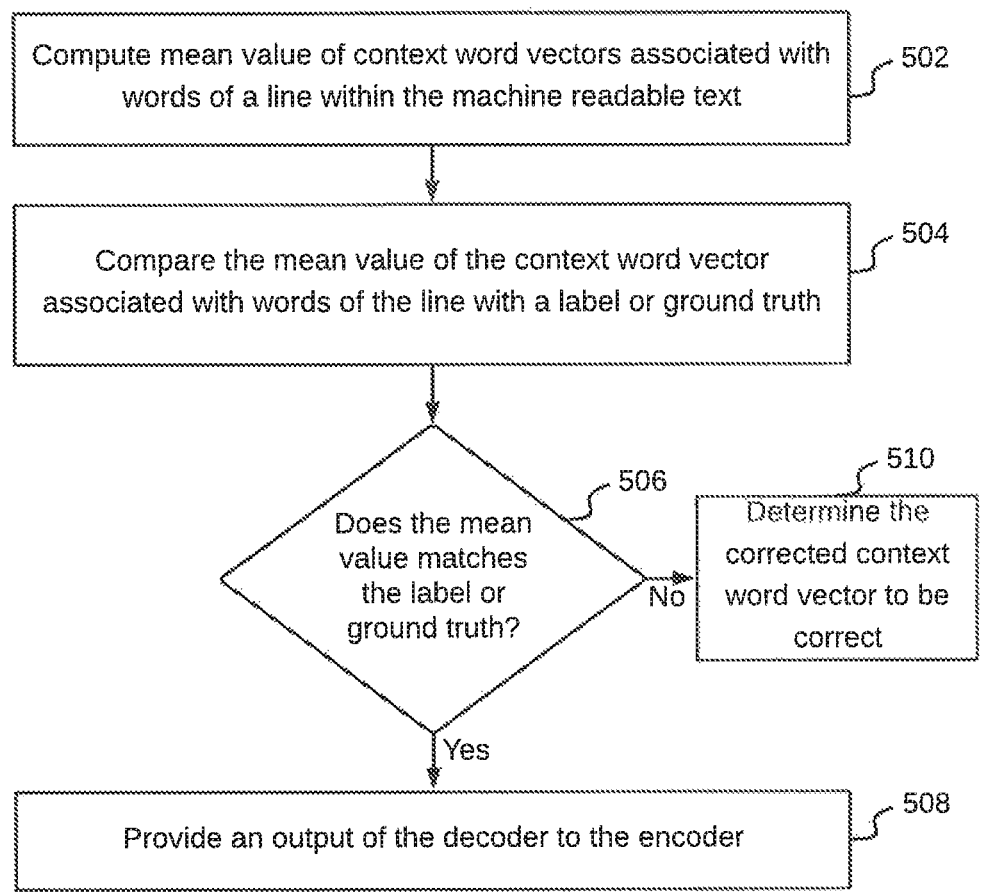
FIG. 5 illustrates flowchart of a method for validating corrected context word vectors associated with words extracted from a document, in accordance with an embodiment.

Referring now to FIG. 5, a flowchart of a method for validating corrected context word vectors associated with words extracted from a document is illustrated, in accordance with an embodiment. Once corrected context word vectors associated with words within a line extracted from the document are generated, in order to validate accuracy of the correction, at step 502, mean value of the context word vectors is computed. Thereafter, at step 504, the mean value of the context word vectors associated with words of the line is compared with a label or ground truth. At step 506, a check is performed to determine whether the mean value is equal to the label or ground truth or not. In other words, the corrected context word vectors generated for words in a line are compared with the actual line (or the correct line) in the document. This comparison and check helps in determining whether the corrected context word vector for the line is correct or incorrect. By way of an example, if the mean value of a context word vector is close to 0, then the error may be back propagated and corrected context word vector may be generated again. However, if the mean value is 1, it would imply that the context word vector has been generated correctly.

Referring back to step 506, when the mean value does not match the label or ground truth (or in other words, when the corrected context word vector for the line is determined to be incorrect), the output of decoder 208, i.e., corrected context word vectors is provided to encoder 206, at step 508. Thereafter, step 402 to 410 are performed again. The output of decoder 208 includes corrected context word vectors associated with words in the line. The output of decoder 208 may be iteratively provided to encoder 206, till the corrected context word vectors representing the line are determined to be correct. In other words, this process may be repeated a number of times.

Referring back to step 506, when the mean value matches the label or ground truth, the corrected context word vectors representing the line are determined to be correct, at step 510. Thus, data extraction device 102 is trained by way of the validation process explained above. This training data is later used by decoder 208 in data extraction device 102 to accurately generate a corrected context word vector for an unrecognized word. This is converted to readable text, and is provided to a user as corrected data extracted from the document.

Figure 6:
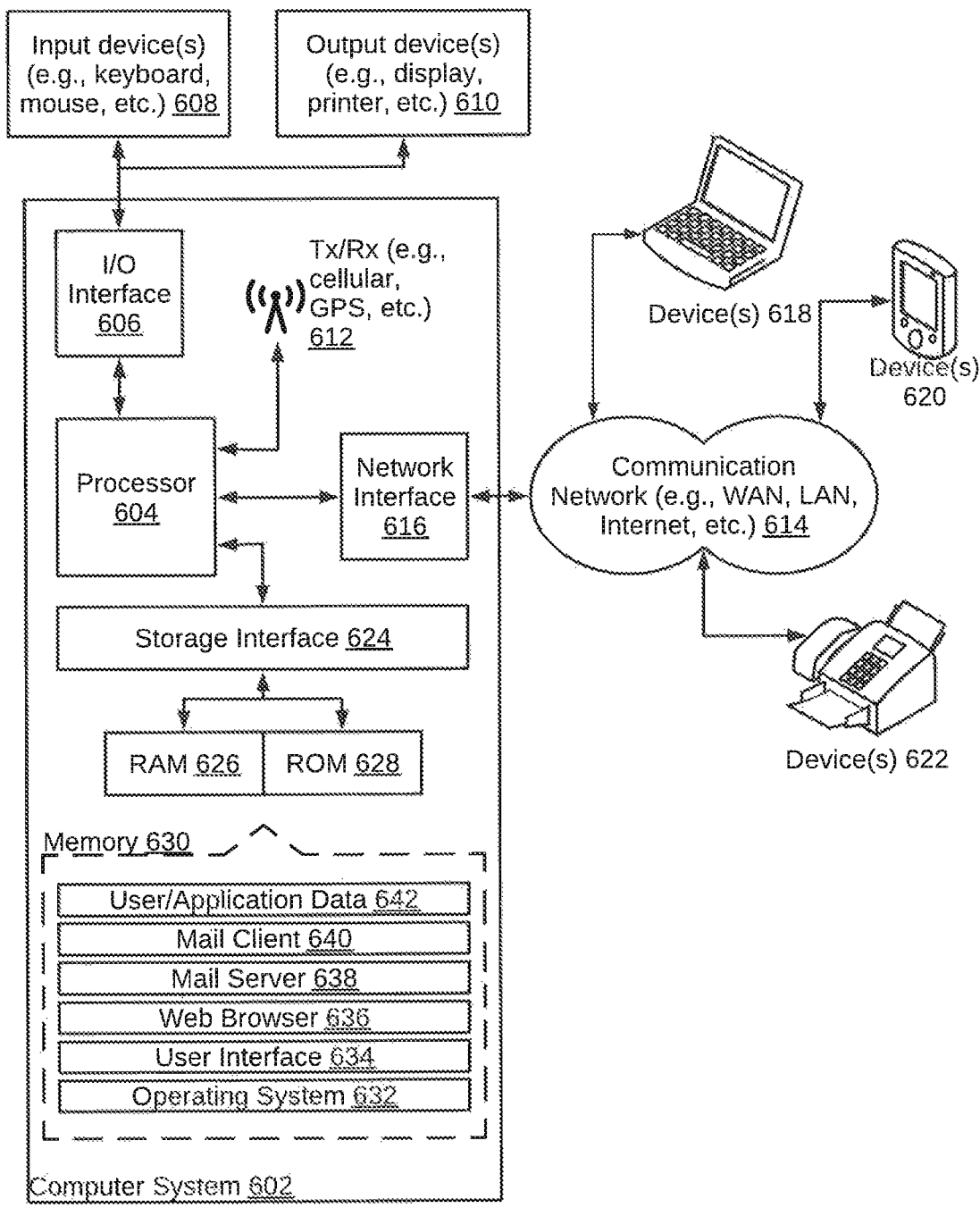
FIG. 6 illustrates a block diagram of an exemplary computer system for implementing various embodiments.

FIG. 6 is a block diagram of an exemplary computer system for implementing various embodiments. Computer system 602 may include a central processing unit ("CPU" or "processor") 604. Processor 604 may include at least one data processor for executing program components for executing user- or system-generated requests. A user may include a person, a person using a device such as such as those included in this disclosure, or such a device itself. Processor 604 may include specialized processing units such as integrated system (bus) controllers, memory management control units, floating point units, graphics processing units, digital signal processing units, etc. Processor 604 may include a microprocessor, such as AMD® ATHLON® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. Processor 604 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 604 may be disposed in communication with one or more input/output (I/O) devices via an I/O interface

606. I/O interface 606 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using I/O interface 606, computer system 602 may communicate with one or more I/O devices. For example, an input device 608 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. An output device 610 may be a printer, fax machine, video display (e.g., cathode ray tube (CRT), liquid crystal display (LCD), light-emitting diode (LED), plasma, or the like), audio speaker, etc. In some embodiments, a transceiver 612 may be disposed in connection with processor 604. Transceiver 612 may facilitate various types of wireless transmission or reception. For example, transceiver 612 may include an antenna operatively connected to a transceiver chip (e.g., TEXASe INSTRUMENTS WILINK WL1283® transceiver, BROADCOM® BCM45501UB8® transceiver, INFINEON TECHNOLOGIES® X-GOLD 618-PMB9800® transceiver, or the like), providing IEEE 802.6a/b/g/n, Bluetooth, FM, global positioning system (GPS), 2G/3G HSDPA/HSUPA communications, etc.

In some embodiments, processor 604 may be disposed in communication with a communication network 614 via a network interface 616. Network interface 616 may communicate with communication network 614. Network interface 616 may employ connection protocols including, without limitation, direct connect, Ethernet (e.g., twisted pair 50/500/5000 Base T), transmission control protocol/internet protocol (TCP/IP), token ring, IEEE 802.11a/b/g/n/x, etc. Communication network 614 may include, without limitation, a direct interconnection, local area network (LAN), wide area network (WAN), wireless network (e.g., using Wireless Application Protocol), the Internet, etc. Using network Interface 616 and communication network 614, computer system 602 may communicate with devices 618, 620, and 622. These devices may include, without limitation, personal computer(s), server(s), fax machines, printers, scanners, various mobile devices such as cellular telephones, smartphones (e.g., APPLE® IPHONE® smartphone, BLACKBERRY® smartphone, ANDROID® based phones, etc.), tablet computers, eBook readers (AMAZON® KINDLE® ereader, NOOK® tablet computer, etc.), laptop computers, notebooks, gaming consoles (MICROSOFT® XBOX® gaming console, NINTENDO® DS' gaming console, SONY® PLAYSTATION® gaming console, etc.), or the like. In some embodiments, computer system 602 may itself embody one or more of these devices.

In some embodiments, processor 604 may be disposed in communication with one or more memory devices (e.g., RAM 626, ROM 628, etc.) via a storage interface 624. Storage interface 624 may connect to memory 630 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 630 may store a collection of program or database components, including, without limitation, an operating system 632, user interface application 634, web browser 636, mail server 638, mail client 640, user/application data 642 (e.g., any data variables or data records discussed in this disclosure), etc. Operating system 632 may facilitate resource management and operation of computer system 602. Examples of operating systems 632 include, without limitation, APPLE® MACINTOSH® OS X platform, UNIX platform, Unix-like system distributions (e.g., Berkeley Software Distribution (BSD), FreeBSD, NetBSD, OpenBSD, etc.), LINUX distributions (e.g., RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 634 may facilitate display, execution, interaction, manipulation, or operation of program components through textual or graphical facilities. For example, user interfaces may provide computer interaction interface elements on a display system operatively connected to computer system 602, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2 platform, MICROSOFT® WINDOWS® platform (e.g., AERO® platform, METRO® platform, etc.), UNIX X-WINDOWS, web interface libraries (e.g., ACTIVEX® platform, JAVA® programming language, JAVASCRIPT® programming language, AJAX® programming language, HTML, ADOBE® FLASH® platform, etc.), or the like.

In some embodiments, computer system 602 may implement a web browser 636 stored program component. Web browser 636 may be a hypertext viewing application, such as MICROSOFT® INTERNET EXPLORER® web browser; GOOGLE® CHROME® web browser, MOZILLA FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APis), etc. In some embodiments, computer system 602 may implement a mail server 638 stored program component. Mail server 638 may be an Internet mail server such as MICROSOFT® EXCHANGE® mail server, or the like. Mail server 638 may utilize facilities such as ASP, ActiveX, ANSI C++/C #, MICROSOFT .NET® programming language, CGI scripts, JAVA® programming language, JAVASCRIPT® programming language, PERL® programming language, PHP programming language, PYTHON® programming language, WebObjects, etc. Mail server 638 may utilize communication protocols such as internet message access protocol (IMAP), messaging application programming interface (MAPI), Microsoft Exchange, post office protocol (POP), simple mail transfer protocol (SMTP), or the like. In some embodiments, computer system 602 may implement a mail client 640 stored program component. Mail client 640 may be a mail viewing application, such as APPLE MAIL® mail client, MICROSOFT ENTOURAGE® mail client, MICROSOFT OUTLOOK® mail client, MOZILLA THUNDERBIRD® mail client, etc.

In some embodiments, computer system 602 may store user/application data 642, such as the data, variables, records, etc. as described in this disclosure. Such databases may be implemented as fault-tolerant, relational, scalable, secure databases such as ORACLE® database OR SYBASE database. Alternatively, such databases may be implemented using standardized data structures, such as an array, hash, linked list, struct, structured text file (e.g., XML), table, or as object-oriented databases (e.g., using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments of the invention provide method and device for automatic data correction using context and semantic aware learning techniques. The method, which involves automatic data correction and validation using context and semantic aware sequence-to-sequence machine learning algorithms, provides better accuracy than the traditional rule based or taxonomy based approaches. The method is a context based approach, hence correction of the numerical data is more accurate than the conventional approaches. Additionally, this approach is easily scalable. Moreover, the model so generated can be deployed easily in any cloud based servers and hence it can also be used for mobile device applications.

The specification has described method and device for automatic data correction using context and semantic aware learning techniques. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for automatic data correction, the method comprising:
    extracting, by a data extraction device, data within a document as machine readable text in a predefined format;
    encoding, by an encoder in the data extraction device, each word of each line in the machine readable text to a multi-dimension word vector;
    generating, by the data extraction device, a context word vector for each word in each line based on multi-dimension vectors associated with one word immediately succeeding a word in a line comprising the word and one word immediately preceding the word in the line;
    decoding, by a decoder in the data extraction device, the context word vector associated with each word in each line to generate a corrected context word vector for each word; and
    validating, by the data extraction device, the corrected context word vector associated with each word in each line, wherein validating comprises:
        computing a mean value of context word vectors associated with words of the line within the machine readable text; and
        comparing the mean value of the context word vectors with a label or ground truth to determine whether the line is correct or incorrect.

2. The method of claim 1 further comprising receiving the document, by the data extraction device, wherein the document comprises at least one content, and wherein the at least one content comprises at least one error.

3. The method of claim 1, wherein the encoding comprises:
    receiving the machine readable text as a plurality of lines;
    splitting each of the plurality of lines into a plurality of words; and
    converting each of the plurality of words in each of the plurality of lines to the multi-dimension word vector.

4. The method of claim 1, wherein each unrecognized word in the machine readable text is assigned a zero-word vector.

5. The method of claim 1, wherein validating further comprises enhancing features of the context word vector to a larger dimension.

6. The method of claim 1 further comprising providing an output of the decoder to the encoder, when the line is determined to be incorrect, wherein the output of the decoder comprises corrected context word vectors associated with words in the machine readable text.

7. The method of claim 6 further comprising iteratively providing the output of the decoder to the encoder, till the line is determined to be correct.

8. The method of claim 1, wherein decoding comprises comparing the context word vector associated with each word in the machine readable text with a training data set to generate the corrected context word vector for each word.

9. A data extraction device for automatic data correction, the data extraction device comprises:
a processor; and
a memory communicatively coupled to the processor, wherein the memory stores processor instructions, which, on execution, causes the processor to:
extract data within a document as machine readable text in a predefined format;
encode each word of each line in the machine readable text to a multi-dimension word vector;
generate a context word vector for each word in each line based on multi-dimension vectors associated with one word immediately succeeding a word in a line comprising the word and one word immediately preceding the word in the line;
decode the context word vector associated with each word in each line to generate a corrected context word vector for each word; and
validate the corrected context word vector associated with each word in each line, wherein validating comprises:
computing a mean value of context word vectors associated with words of the line within the machine readable text; and
comparing the mean value of the context word vectors with a label or ground truth to determine whether the line is correct or incorrect.

10. The data extraction device of claim 9, wherein the processor instructions further cause the processor to receive the document, by the data extraction device, wherein the document comprises at least one content, and wherein the at least content comprises at least one error.

11. The data extraction device of claim 9, wherein to encode, the processor instructions further cause the processor to:
receive the machine readable text as a plurality of lines;
split each of the plurality of lines into a plurality of words; and
convert each of the plurality of words in each of the plurality of lines to the multi-dimension word vector.

12. The data extraction device of claim 9, wherein to validate, the processor instructions further cause the processor to enhance features of the context word vector to a larger dimension.

13. The data extraction device of claim 9, wherein the processor instructions further cause the processor to provide an output of a decoder to an encoder, when the line is determined to be incorrect, wherein the output of the decoder comprises corrected context word vectors associated with words in the machine readable text.

14. The data extraction device of claim 13, wherein the processor instructions further cause the processor to iteratively provide the output of the decoder to the encoder, till the line is determined to be correct.

15. The data extraction device of claim 9, wherein to decode, the processor instructions further cause the processor to compare the context word vector associated with each word in the machine readable text with a training data set to generate the corrected context word vector for each word.

16. A non-transitory computer-readable storage medium having stored thereon, a set of computer-executable instructions causing a computer comprising one or more processors to perform steps comprising:
extracting data within a document as machine readable text in a predefined format;
encoding each word of each line in the machine readable text to a multi-dimension word vector;
generating a context word vector for each word in each line based on multi-dimension vectors associated with one word immediately succeeding a word in a line comprising the word and one word immediately preceding the word in the line;
decoding the context word vector associated with each word in each line to generate a corrected context word vector for each word; and
validating the corrected context word vector associated with each word in each line, wherein validating comprises:
computing a mean value of context word vectors associated with words of the line within the machine readable text; and
comparing the mean value of the context word vectors with a label or ground truth to determine whether the line is correct or incorrect.

* * * * *